Dec. 7, 1937.  A. C. LINDGREN ET AL  2,101,439
GRAIN BINDER
Filed Nov. 14, 1935  6 Sheets-Sheet 2

Inventors
A. C. Lindgren
and C. R. Raney
By V. F. Lassagne
Atty.

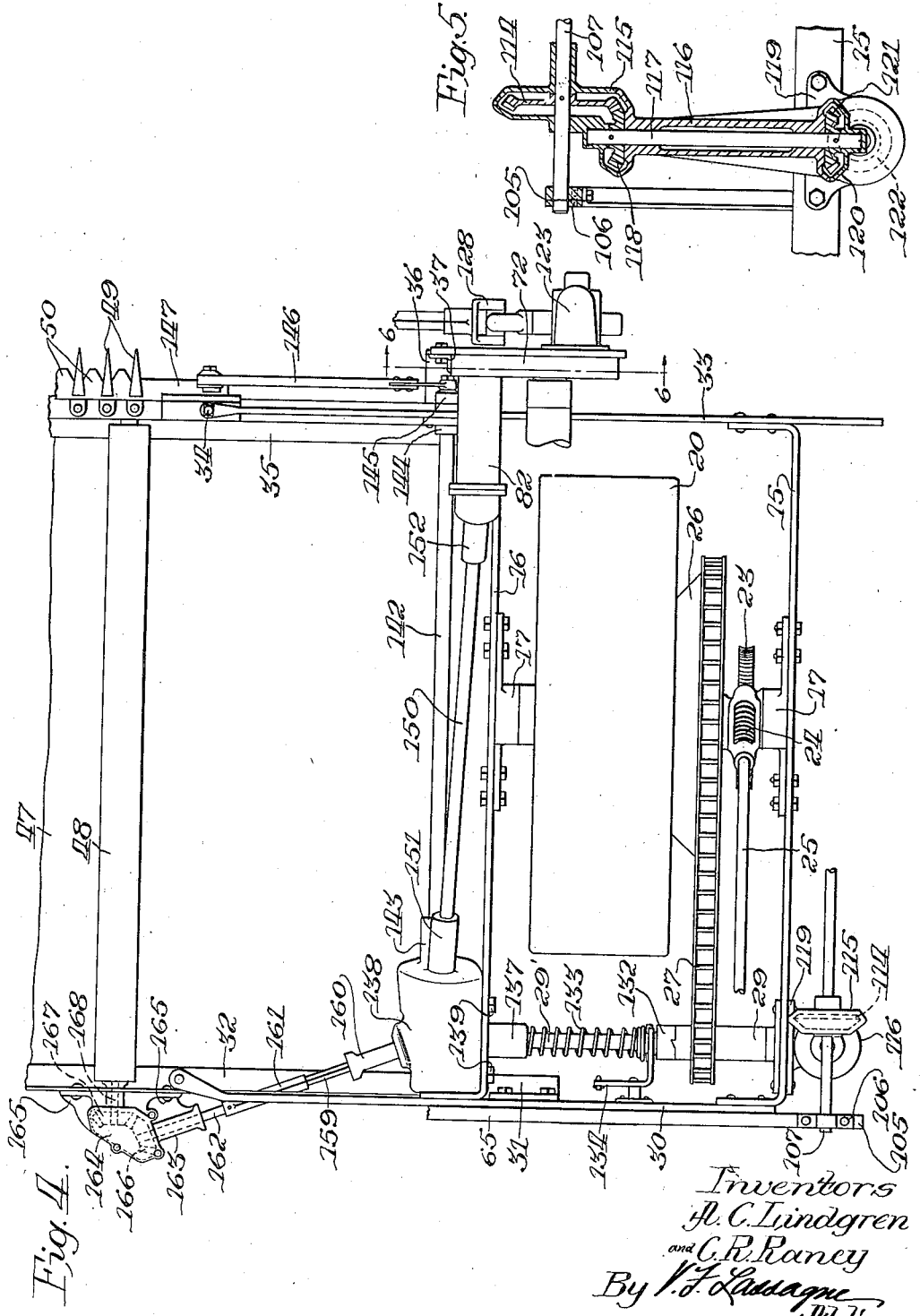

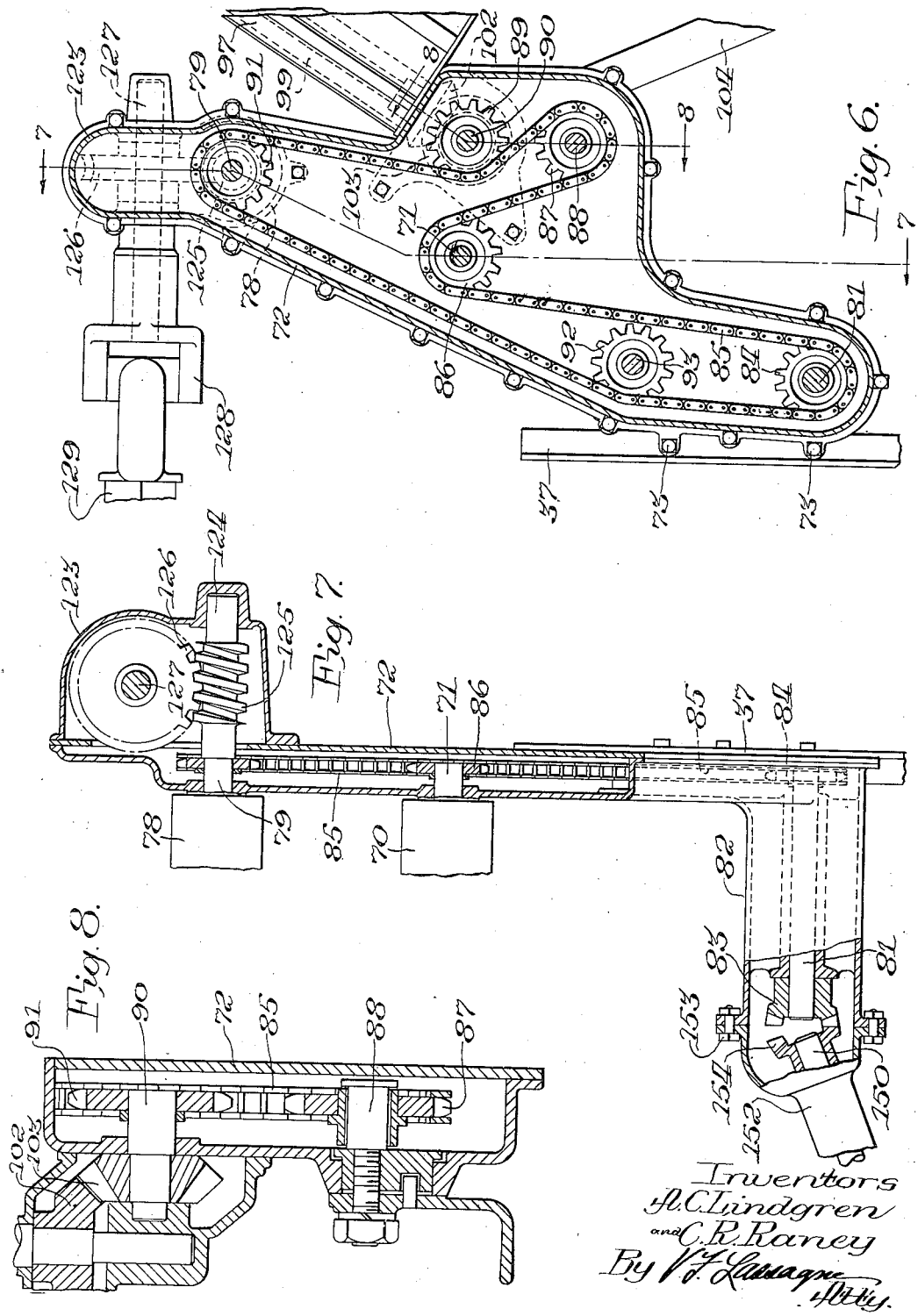

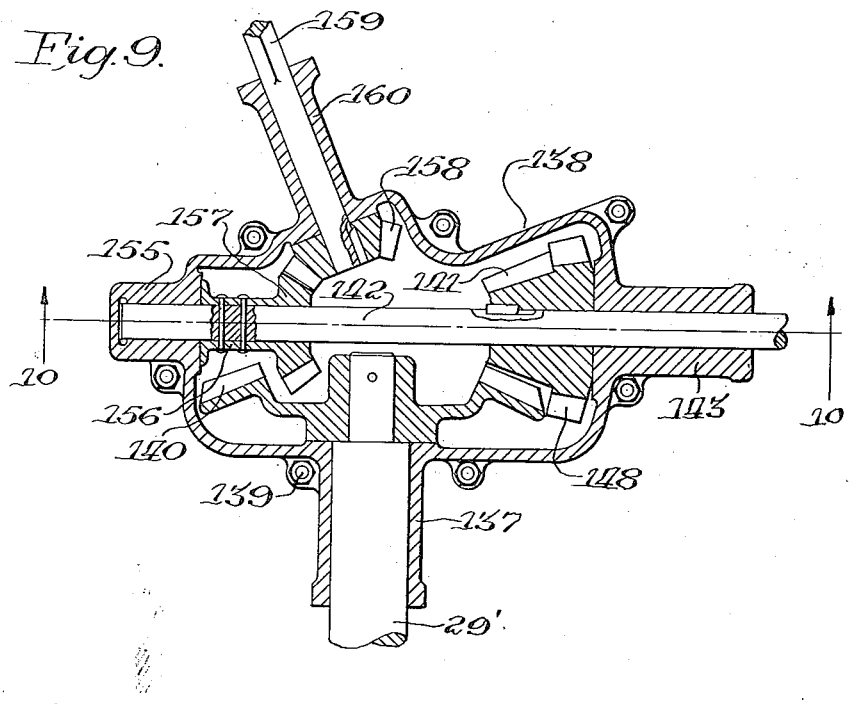
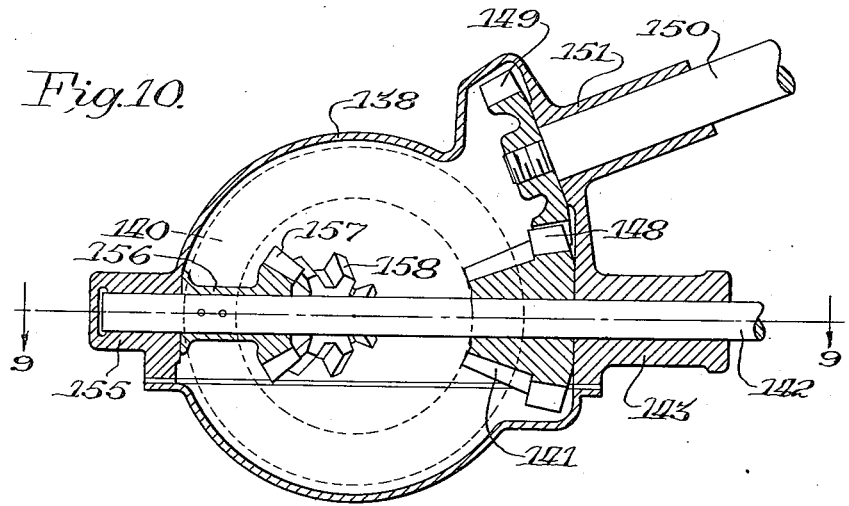

Patented Dec. 7, 1937

2,101,439

UNITED STATES PATENT OFFICE

2,101,439

GRAIN BINDER

Alexus C. Lindgren, Chicago, and Clemma R. Raney, Riverside, Ill., assignors to International Harvester Company, a corporation of New Jersey Application November 14, 1935, Serial No. 49,780

33 Claims. (Cl. 56—131)

The invention relates to grain binders.

These machines have become quite standard in the art and comprise a wheel mounted frame carrying a harvester platform including a platform conveyer, there being a reel rotatable above the platform and cooperating with a sickle at the front end of the platform to move the grain onto the platform conveyer as it is being cut. The grain then is delivered by the platform conveyer to an elevator conveyer which discharges the grain onto a binder deck, adjacent which is the binding attachment for binding the grain into bundles. The various operative parts, such as the binding attachment, the reel, and the elevator conveyers are driven by sprocket wheel and chain drives, by power which may be derived either from the ground wheel or from the power take-off shaft of the tractor. These exposed sprocket wheels and chains are difficult to lubricate and require frequent application of oil during operation to prevent wear and breakage. Further, the chains are noisy and constitute quite a hazard to life and limb of persons on and adjacent the machine while the parts are being driven.

It is highly desirable, therefore, that these various exposed chain drives be eliminated and that a more efficient arrangement of drives be provided, which will be more easily lubricated and that will generally overcome the objections above noted.

The primary object of the invention, therefore, is to provide a grain binder in which the various operative units thereof will be gear driven.

Another object is to enclose the various gear units in housings which may be packed with grease or lubricant, so that, to as great an extent as possible during a harvest season, the binder will not have to be lubricated.

A more specific object is to provide in a grain binder a primary gear box unit, from which emanate driven shafts for operating the various operative units of the binder, such for example as the elevator, the sickle, and the platform conveyer.

Another object of the invention is to provide a novel arrangement of enclosed gearing for driving the elevator.

Another important object is to provide such an elevator gear driving unit including means for taking off power to drive a butt adjuster.

Still another object is to provide such elevator drive gear set including means for taking off power to drive the reel in a simple and effective manner.

Another object is to provide an improved gear drive arrangement for the binding attachment of the grain binder.

Other important objects of the invention will become known to those versed in this art as the improved grain binder is more fully described.

These important objects may be achieved in a grain binder of the type shown in the drawings accompanying this application, where it will be seen that the grain binder embodies a wheel carried frame. The frame carries a primary gear box unit enclosing gearing which may receive power from the grain binder main wheel or from a shaft deriving power from the power take-off shaft of a tractor that serves to pull the grain binder. Emanating from this primary gear box are a plurality of shafts, one of which is connected to a supplementary enclosed gear drive unit for driving the elevator rollers of the elevator that delivers the grain to the binder deck. From this gear drive unit just mentioned power is taken off in a simple manner to drive a butt adjuster, and similarly a simple driving means is provided for taking power off to drive the reel. Another shaft emanating from the primary gear box serves to drive the sickle, and a third shaft emanating from the primary gear box is connected to furnish power to drive the platform conveyer.

In the particular embodiment of the invention herein disclosed the grain binder main wheel serves to provide the power delivered to the primary gear box for distribution to the various operative units mentioned. In accomplishing this, the main wheel drives a sprocked wheel and chain, in turn driving a shaft that delivers power to the primary gear box. This shaft also serves to drive a separate enclosed gear unit for driving the binding attachment of the grain binder. All of these drives, with the exception of the main wheel drive to the chain just mentioned, are shaft and gear arrangements, the gears arranged in compact enclosed nests packed with grease, that do not require frequent attendance.

While a main wheel, or bull wheel, drive is herein shown, it should be kept in mind that power may enter the primary gear box from a suitable shaft coupled to the power take-off shaft of a tractor which serves to pull the binder, if desired.

In the accompanying sheets of drawings illustrating a preferred and practicable example of the improved grain binder structure:

Figure 3 is a front elevational view of the grain binder;

Figure 4 is a fragmentary plan view on an enlarged scale, of the grain binder main frame, showing the various gear drive units;

Figure 6 is a side elevational view, on an enlarged scale, and partly in section, through the drive unit for the elevator, butt adjuster and reel, taken along the line 6—6 of Figure 4 looking in the direction of the arrows;

Figure 7 is a sectional view through the same drive unit taken along the line 7—7 of Figure 6, looking in the direction of the arrows;

Figure 8 is a detail sectional view taken along the line 8—8 of Figure 6, looking in the direction of the arrows, to show the butter drive;

Figure 9 is a horizontal sectional view through the primary gear drive unit taken along the line 9—9 of Figure 10; and, Figure 10 is a vertical sectional view through the primary gear drive unit, taken along the line 10—10 of Figure 9, looking in the direction of the arrows.

Figure 1:
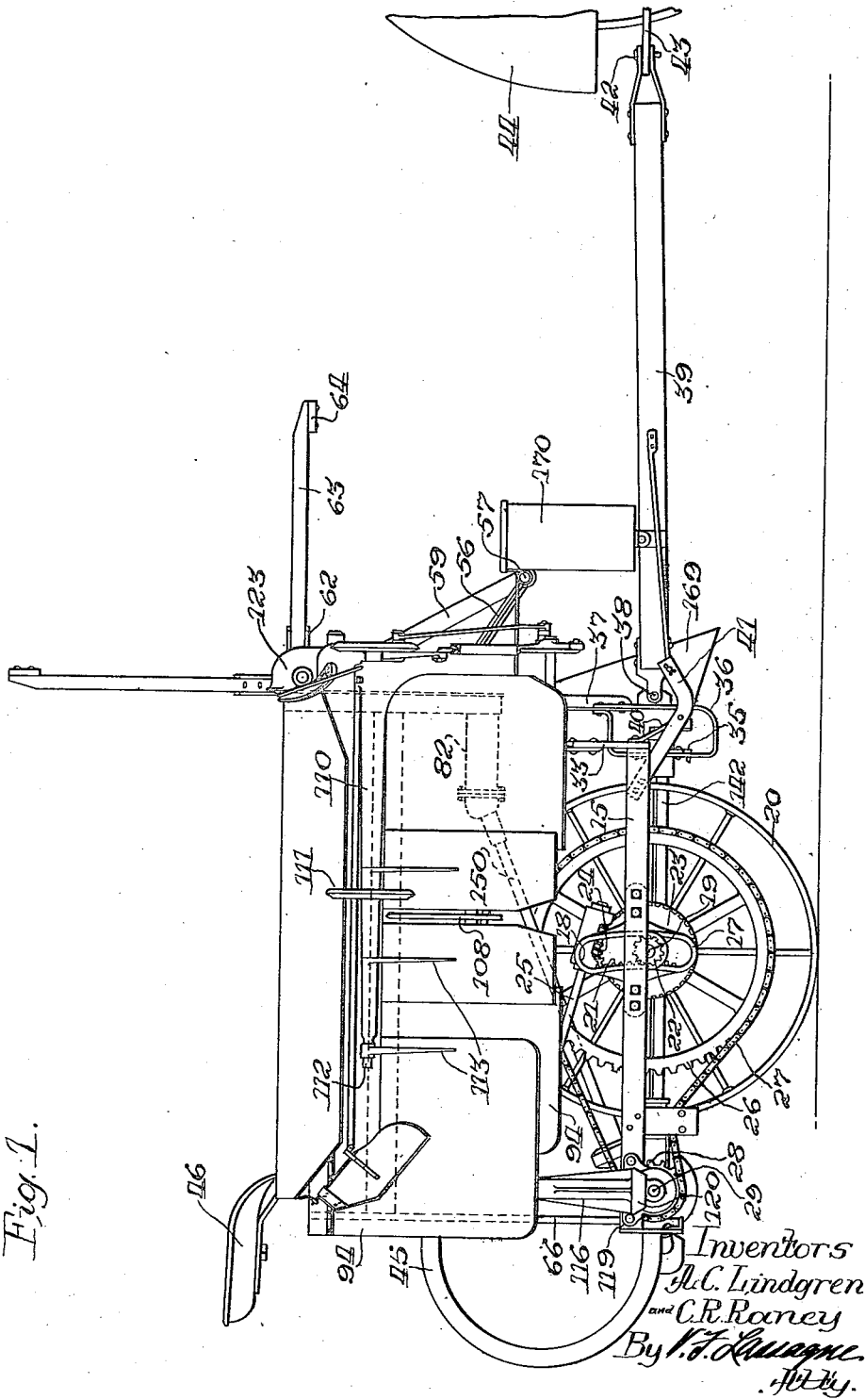
Figure 1 is a side elevational view of the grain binder pulled by a tractor, and viewed from the stubbleward side.

Referring to Figure 4, it will be seen that the improved grain binder embodies longitudinally disposed, spaced main frame members 15 and 16, each of which carries a bracket 17, said brackets being in transverse alignment. Each of these brackets is formed with an arcuate, elongated, vertically disposed slot 18 in which is disposed the axle 19 carrying a main wheel 20 for supporting the stubbleward side of the grain binder. (See Figure 1.) The stubbleward bracket 17 is formed with a row of teeth that form a rack 21, and the adjacent portion of the axle 19 carries a spur gear 22 in mesh with said rack 21. The axle also carries a worm wheel 23 in mesh with a worm wheel 24 on a shaft 25 suitably supported in a conventional manner. Rotation of the shaft 25 by a hand crank from the rear end of the main frame rotates the worm wheel 24, the wheel 23, and the spur gear 22, causing the spur gear to travel along the rack 21 for raising or lowering the axle, depending upon the direction of rotation of the shaft 25. In this fashion, which is conventional in the art, the main frame 15, 16 may be raised or lowered with respect to the main wheel 20.

Secured to the main wheel 20 for rotation therewith is a large sprocket wheel 26, which drives a chain 27, and a small sprocket gear 28, (shown in Figure 1), carried on a transverse shaft 29 appropriately journaled in the rear end of the main frame 15, 16. This shaft 29 serves as a main power shaft for all of the operative mechanisms of the grain binder subsequently to be described. In the present embodiment of the invention it will now be seen that this main power shaft 29 is rotated by power derived from the ground wheel 20. If desired, this shaft 29 may be appropriately driven in a manner well known in this art from the power take-off shaft of the tractor that pulls the grain binder. Such arrangement, it is to be understood, constitutes a well known alternative expedient for the ground wheel drive herein disclosed.

The rear ends of the frame pieces 15, 16 are cross-connected by a transverse frame piece 30 at their rear ends. This cross-frame piece 30 carries a depending plate 31 to which is connected a rear transverse angle-bar 32, said angle-bar extending a substantial distance transversely in a grainward direction. The front ends of the frame pieces 15, 16 are connected by a transverse frame member 33, which at its stubbleward end is bent downwardly to form a flange for connection by a bolt 34 to a transverse Z-bar 35, said Z-bar being parallel to the angle-bar 32 and extending substantially the same distance in a grainward direction. The stubbleward end of the Z-bar is passed into a looped frame member 36, which is connected to the Z-bar and to the frame pieces 33 and 16. The looped member 36 carries a standard 37 for a purpose later to appear.

The front end of the loop 36 carries a horizontal hinge pin 38, to which is connected a draw-element 39. The frame piece 33 also carries a forwardly and downwardly extending member 40 for supporting a bent arm 41 connected between the draw-element 39 and main frame piece 15 in a manner to extend below the pivot 38 and spanning the same. The pivot 38 is the usual tilt pivot for enabling tilting of the main frame of the grain binder to adjust the height of cut of the machine in a manner well known in this art.

As shown in Figure 1, the draw-element 39 may be connected by a vertical hinge pin 42 to the draw-bar 43 of a tractor, generally indicated at 44, the tractor serving to draw the grain binder.

The grain binder main frame in any conventional way carries the usual longitudinally disposed seat pipe 45, on which is mounted an operator's seat 46. The angle-bar 32 and Z-bar 35 carry the usual platform 47, and said bars also serve to mount, adjacent their stubbleward ends, a platform conveyer drive roller 48. The front Z-bar carries the usual finger guards 49, between which is reciprocably mounted a sickle 50. The grainward end of the platform is not shown, but it will be understood that it is conventionally supported on a grain wheel and that it also carries an idler platform roller, about which and the roller 48 is an endless platform conveyer 51 indicated in Figures 2 and 3. The seat pipe 45 carries an arm 52, which supports in the usual way a wind-board 53 disposed along and over the rear edge of the platform in a well known manner.

The front end of the seat pipe 45 carries a bracket for mounting a transverse shaft 54, which has its other end carried in a bracket 55 fastened to the upper end of the standard 37 at the front end of the machine. This shaft 54 carries a swingably mounted reel bracket 56, which in turn carries a transverse shaft 57 for rockably mounting a webbed bracket 58 that is preferably welded to and carries an upwardly and transversely curved gooseneck 59, which at its grainward end carries brackets 60, as shown in Figure 3, for rotatably journaling a transverse reel shaft 61. Said shaft carries the usual reel spiders 62 which mount arms 63, in turn carrying the reel bats 64, said reel being positioned in the usual manner with respect to the platform to bat the standing grain into the guard fingers and cutting apparatus and assist movement of the cut grain onto the platform conveyer 51, all in the usual manner.

Figure 2:
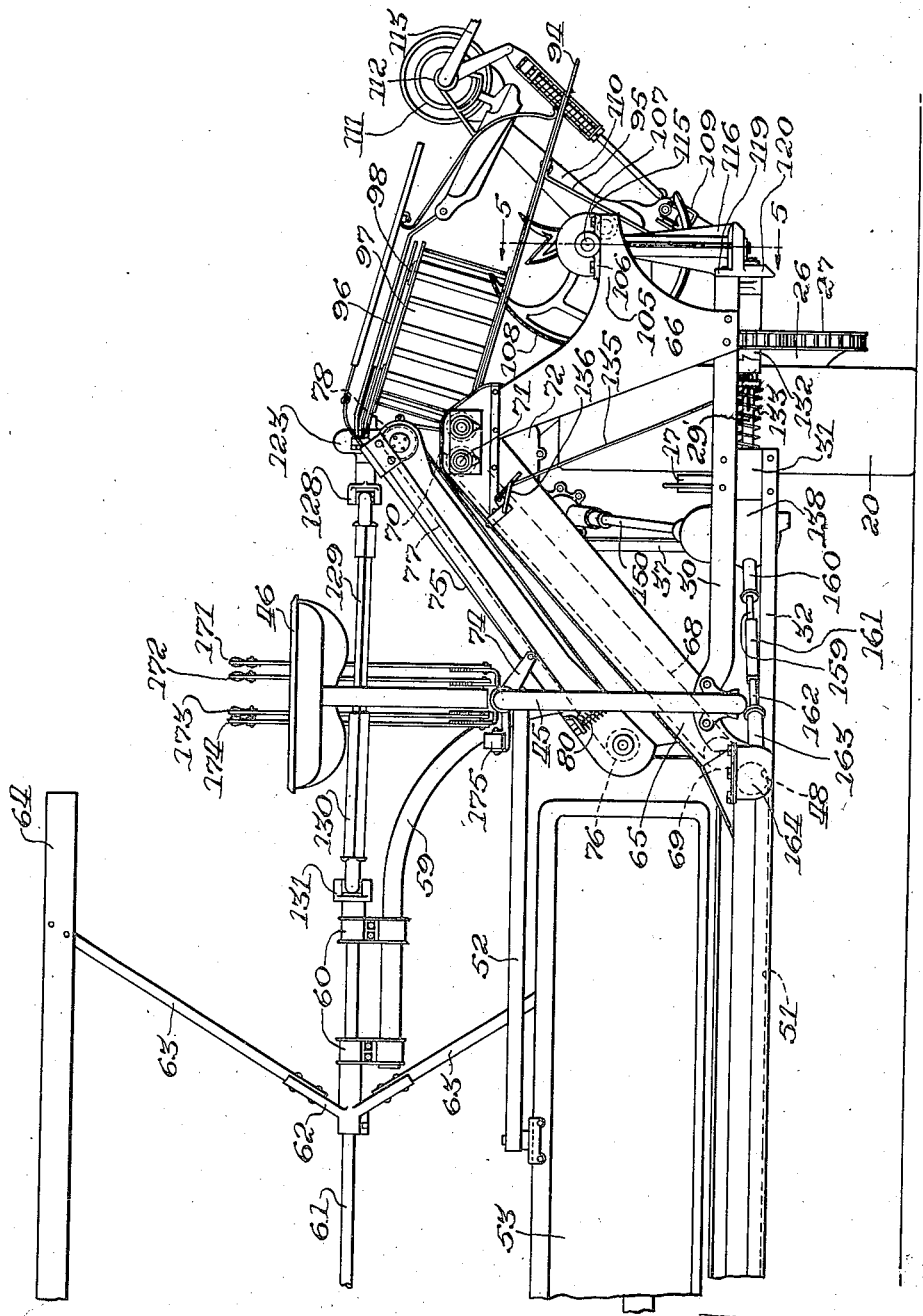
Figure 2 is a rear elevational view of the grain binder.

As best shown in Figure 2, the rear cross frame piece 30 carries an elevator frame 65, which at its lower end is connected to the angle-bar 32 adjacent the rear end of the mount for the platform roller 48, said frame 65 being inclined upwardly and stubblewardly in the usual manner. The upper end of the rear side of the elevator frame 65 is supported by another frame piece 66, also connected to the member 30, the two members 65 and 66 forming in effect an inverted V, and the latter frame member 66 serving to support a binding attachment, as will later more fully appear.

The Z-bar 35 at the front of the machine carries an elevator frame piece 67 corresponding to the frame piece 65, the two pieces 65 and 67 constituting the complete elevator frame within which is disposed an endless apron-type of conveyer 68 trained around an idler roller 69 at its lower end and around a driven roller 70 at its upper end, said upper roller being carried on a shaft 71 journaled in an elongated, irregularly shaped gear housing 72 secured to the upper portion of the elevator frame element 67 and at 73 by bolts to the standard 37 (see Figure 6). The seat pipe 45 carries a bracket 74, shown in Figure 2, for supporting an upper elevator frame 75 carrying an idler roller 76 and an endless conveyer 77, which is trained around a drive roller 78 driven from a shaft 79 journaled in the upper end of the gear box 72. This upper elevator frame 75 is yieldingly mounted, as at 80, for yielding movement relative to the main elevator frame 65, 67.

This gear box 72, as shown in Figures 6 and 7, is very shallow and in addition to the shafts 71 and 79 heretofore described, serves to mount a drive shaft 81 in the lower end thereof, the shaft being passed through a lateral extension 82 of the housing 72 at the far end of which the shaft carries a bevel gear 83. The shaft 81 within the housing 72 carries a sprocket wheel 84, around which is trained a roller chain 85 which passes around a sprocket wheel 86 on the shaft 71 to drive the latter, said chain then continuing around a sprocket wheel 87 on a shaft 88 journaled in the box 72, the chain then driving a sprocket wheel 89 on a shaft 90 journaled in the box 72. The chain then drives a sprocket wheel 91 to turn the shaft 79 for the upper elevator conveyer roller 78, said chain then passing around an idler wheel 92 mounted on a shaft 93 carried within the casing 72.

Extending in a subbleward direction from the top of the frame piece 66 is the usual inclined binder deck 94 supported by a brace 95 from any suitable part on the frame, as shown best in Figure 2. This binder deck at its front end carries a frame structure 96 for supporting an endless type of butter 97, said butt adjuster being trained around an idler roller, not shown, mounted on a shaft 98 carried by the binder deck and the frame 96. The other end of the endless butt adjuster is trained around a roller 99 shown in Figure 6, which roller is journaled in a hollow bracket 101, within which is a bevel gear 102 driven from a bevel gear 103 on the shaft 90 carried by said housing 72. Thus it will be seen that the chain 85 from within the enclosed gear housing 72 serves also to supply power for driving the butt adjuster 97. The housing 72 is strengthened in its mounting by means of a brace 104 connected between the casing 72 and the frame piece 33, as shown in Figure 3.

As shown in Figure 2, the frame piece 66 includes a stubbleward extension 105 on which is mounted a bracket 106 for supporting a shaft 107 that carries a needle 108 movable in the usual manner through slots in the binder deck 94 for tying the grain on the binder deck in bundles. Looking at Figure 3, it will be seen that the front transverse frame piece 33 includes a bracket 109 at its subbleward end for shiftably mounting in the usual manner a knotter frame 110 which includes knotting mechanism generally shown at 111, with which the needle 108 cooperates in tying the bundles. The knotter includes the usual operating shaft 112 and bundle discharge arms 113.

Figure 5:
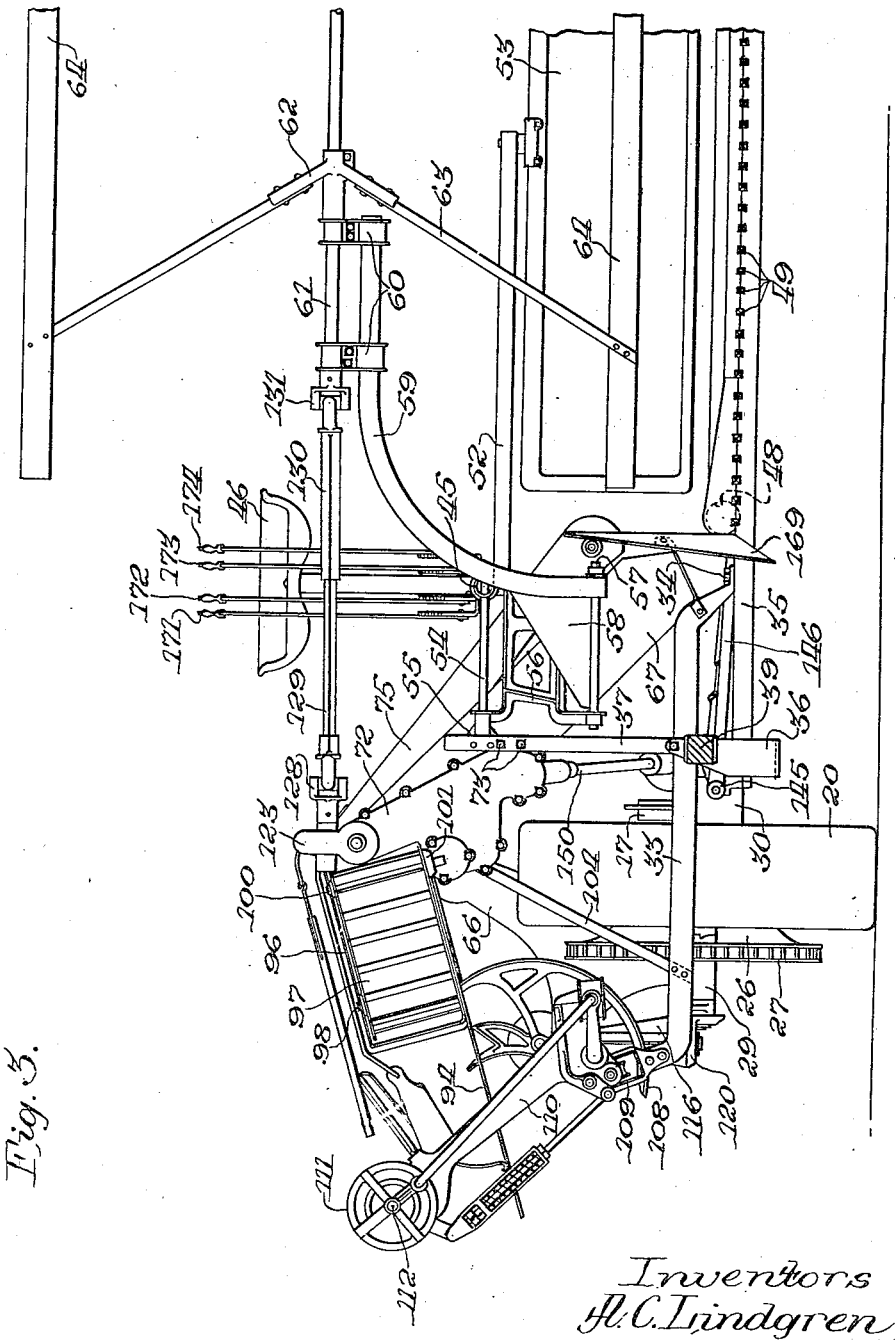
Figure 5 is a detail, vertical, sectional view through the gear drive unit that drives the binding attachment, taken along the line 5—5 of Figure 2, looking in the direction of the arrows.

As shown in Figures 2, 4, and 5, the needle shaft 107 has made fast to it a bevel gear wheel 114 enclosed within a casing 115 within which the shaft 107 is journaled, said casing 115 being mounted on top of a continuation casing 116, which mounts for rotation a vertical shaft 117 which carries at its upper end a bevel gear wheel 118 in mesh with the bevel gear 114. The lower end of the casing 116 includes an appropriate bracket 119 for rigid mounting on the frame piece 15. The lower end of said casing 116 includes another gear box portion 120, which carries the lower end of the shaft 117, there being a bevel wheel 121 carried on the lower end of the shaft 117 within the box portion 120, said bevel wheel 120 meshing a bevel gear wheel 122 within another portion of the housing 120, which bevel gear wheel 122 is driven from the main shaft 29.

Referring now to Figures 6, 7, 3, and 4, it will be seen that the upper end of the casing 72 carries a housing extension part 123 for journaling an extension 124 of the shaft 79, said extension 124 carrying a worm wheel 125 enclosed in the housing 123 to drive a worm wheel 126 on a shaft 127 journaled in the housing extension 123 and projecting therefrom, as shown in Figure 6, in a transverse direction toward the reel shaft 61. This shaft 127, where it protrudes from the casing 123, carries a universal joint 128. As shown best in Figures 2 and 3, the universal joint 128 couples the shaft 127 with a square shaft portion 129 telescopically and slidably fitting into a sleeve shaft 130, which in turn is connected by a universal joint 131 to the reel shaft 61. Power for driving the reel is thus taken from the shaft 79 for the upper elevator roller 78, and, by means of the worm gearing 125, 126, the speed of the reel is slowed down to the desired rate.

This main power shaft 29, as has been stated, is driven from the chain 27 and the grain wheel 20, there being a clutch 132 operatively associated with the shaft 29 normally held engaged by a spring 133 surrounding a shaft extension 29' of the shaft 29. By means of a shifter lever 134 operable by a link 135, (see Figure 2), and a handle 136 to throw the clutch out of engagement, the shaft extension 29' is separated from the shaft 29 to stop delivery of power to the shaft 29'. The handle 136 is appropriately mounted on the elevator frame 65 where it is in a position accessible to the operator on his seat 46.

As shown best in Figures 4, 9, and 10, it will be seen that the shaft 29' is journaled in the sleeve portion 137 of a primary gear box 138, which is appropriately secured by bolts 139 to the main frame member 16, or other portions of the frame, said primary gear box 138 being located preferably at the rear end of the main frame. The shaft 29' extends into the gear box 138 where it carries a relatively large bevel gear 140. This bevel gear is in mesh with a bevel pinion 141 made fast to a shaft 142 journaled in the housing 138, said shaft 141 extending forwardly out of a journal bracket 143 formed as a part of the gear box 138. The shaft 142, as shown best in Figure 4, extends longitudinally forwardly from the box 138 and at its front end is appropriately journaled in a bearing bracket 144 carried by the cross frame member 33. The front end of the shaft 142 carries a crank 145, with which is connected a pitman 146 that drives a knife-head 147 for reciprocating the sickle 50.

Looking again to Figures 9, 10, and 4, it will be seen that the bevel gear 141 includes an auxiliary bevel gear 148 meshing with and driving a bevel gear 149 on a shaft 150 journaled in a sleeve extension 151 of the casing 138 directly above the shaft 142. This shaft 150 is inclined upwardly and forwardly and has its upper end journaled in a sleeve bracket 152 which is connected by bolts 153 to the housing extension 82 of the gear box 72. Said shaft 150 within said enclosure just described carries a bevel gear 154 which meshes with the bevel gear 83, thereby establishing a driving connection through the shaft 81 and sprocket wheel 84 to drive the chain 85, which, through the various power take-off means established within the casing 72, serves to drive the elevator rollers 78 and 70 as well as the butter 97 and the reel shaft 61.

The shaft 142 at its rear end is journaled in a sleeve extension 155 of the gear box 138, the rear end of said shaft 142 within the box having made fast thereto a sleeve 156, which includes a bevel gear 157. This bevel gear 157 meshes with a bevel wheel 158 made fast to a shaft 159 journaled in a sleeve extension 160 of the gear box 138. This shaft 159 is square and telescopically fits into a square shaft portion 161, which in turn is made fast with a shaft part 162 journaled in a bearing sleeve 163 of a gear box 164 made fast at 165 to the angle-bar 32. The shaft part 162 carries a bevel gear 166 in mesh with a bevel gear 167 on a shaft 168 that drives the platform drive roller 48 (see Figure 4).

From the mechanism thus far described it will be noted that the gear box 138 contains gearing which receives power from the main power shaft 29, 29' and that this power is distributed in three directions to drive the various operative units of the grain binder. For instance, the shaft 150 extends forwardly and upwardly to drive the elevator conveyers, the butter, and the reel; the shaft 142 extends horizontally forwardly to drive the sickle 50; and the shaft 159 extends grainwardly in a diagonal direction to transmit rotation to the platform drive roller 48.

At the stubbleward end of the platform, the Z-bar 35 and frame piece 33 appropriately carry in the usual manner an inside divider 169. The draft element 39 carries a twine can 170, which serves as a source of supply of twine in the usual manner for the needle 108 of the binding attachment. Further, the seat pipe 45 in front of the operator's seat 46 carries the usual four levers 171, 172, 173, and 174. The lever 171 is appropriately connected in the usual way by connections, not shown, for releasing the pivot 38, so that the binder main frames 15 and 16 may tilt downwardly or upwardly for the purpose of altering the height of cut of the Z-bar 35 and the cutting apparatus mounted thereon. The lever 172 has appropriate connections, not shown, and which are conventional, for raising and lowering the reel frame bracket 56, so that the reel shaft 61 may be moved fore and aft and with it, of course, the reel 64 to change the relation thereof with respect to the cutting apparatus. The lever 173 is connected in the usual way by connections, not shown, for raising and lowering the reel with respect to the cutting apparatus and the platform; and the lever 174 serves, through the usual connections, not shown, to shift the binding attachment 110 fore and aft relative to the binder deck 94. A foot lever 175 is also provided on the seat pipe 45 in the usual way for operating connections, not shown, that serve to dump a bundle carrier attachment of conventional form, not shown. This completes the detailed description of the various parts and their assembly. The use and operation of the improved grain binder thus disclosed will now be described.

By means of the draw-element 39, a tractor 44, or other source of draft power, serves to pull the grain binder, causing the main wheel 20 to rotate as it travels over the ground, thus imparting rotation to the sprocket wheel 26 and the chain 27, which imparts rotation to the main power shaft 29 and 29' when the clutch arm 32 is in its normal engaged position. With the shaft 29' thus turning, the power is transmitted to the bevel gear 140 within the primary gear box 138, said gear driving the bevel gear 141 and shaft 142 to drive the pitman 146 and sickle 50. At the same time the bevel gear wheel 148 is driven, which meshes with and drives the bevel gear wheel 149 to drive the shaft 150, which, through gears 154 and 83, drives the shaft 81 and sprocket wheel 84, the latter being located in the gear box 72, wherein are contained various sprocket wheels and a driving chain 85 to drive the butter 97 and upper rollers 78 and 70 of the elevator conveyers 68 and 77. Power is also taken from the upper roller shaft 79 through the worm gearing 125, 126 to drive the reel shaft 61, by means of a flexible shafting 129 and 130, which includes universal knuckles 128 and 131, so that power can always be delivered to the reel shaft 61, regardless of its position of adjustment up or down, or fore and aft. At the same time power is taken from the shaft 142 within the gear box 138 to drive the gears 157, 158 and shaft 159, which in turn is connected in the manner described to drive the platform drive roller 48, whereby the platform conveyer 51 is driven. Power is also taken from the shaft 29 to drive the gearing 121 and 122 to operate the shaft 117 and, through gearing 118, 114, to drive the needle shaft 107 for operating the binding attachment. Thus all operative parts are set into motion and, as the machine travels through standing grain, the grain is cut in the usual manner, with the reel bats 64 pushing the cut grain onto the platform conveyer 51. Said platform conveyer 51 moves the cut grain in the direction of the elevator where the endless apron conveyers 68 and 77 receive the grain between them to elevate it in the usual manner onto the binder deck 94, the butt ends of the grain being aligned by the butt adjuster 97 in a well known manner, so as to insure proper tying of the forming bundle of grain by the binding attachment, which is of conventional pattern and is operatively associated with the binder deck in the usual way.

As a bundle is tied, the discharge arms 113 serve to eject the bundles from the deck 94 onto the field or into a conventional bundle carrier, not shown.

It is of interest to note that all exposed drive chains heretofore used in operating grain binders have been eliminated by the improved binder of this invention. The main gear box unit 138, from which power is distributed for the various operating parts, is packed with grease which will last throughout a harvest season without any further attention or lubrication of parts. Also dirt and dust are excluded to prevent wear. The same remarks apply to the gear box unit shown in Figure 5 for driving the binding attachment, as all gears are enclosed in an oil retaining, dust proof housing, which requires no further attention, once the housing has been packed with grease. This is true also of the gear box 164, which contains the gears for driving the platform roller 48. Further, the large housing 72 shown in Figure 6, which contains the driving parts for the butter, the elevator rollers, and the reel, is also dust proof and packed with grease, so that it will require no lubrication through a season of harvesting.

The improved driving arrangements are such that the life of the grain binder is very materially increased and all noise and objectionable clatter is absolutely reduced to a minimum. Further, the structure is such as to make it possible for the grain binder to operate continuously, as it is not necessary to stop the machine while working for the purpose of lubricating the same, which is the most frequent occasion for stoppage in the old chain drive grain binders. The present machine is far more sturdy and can be operated at higher speeds without in any way endangering breakage of the mechanism.

From this disclosure it will now be apparent that an improved gear drive grain binder has been provided, which achieves all of the objects heretofore recited for the invention.

It is the intention to cover all such changes and modifications of the practicable embodiment of the invention herein chosen for purposes of illustration which do not in material respects constitute departures from the spirit and scope of the invention as defined in the appended claims.

What is claimed is:

1. A grain binder having a main frame, a platform carried thereby including a conveyer, a sickle carried by the platform, an elevator carried at one end of the platform including conveyers receiving cut grain from the platform conveyer, a main power shaft carried on the frame, means for driving said shaft, a gear box carried on the frame enclosing gearing driven from said power shaft, and three separate shafts journaled respectively at one end in said box and driven by said gearing, one of said separate shafts extending transversely of the line of draft and connected to drive the platform conveyer, another shaft extending horizontally and longitudinally to drive the sickle, and the last shaft being inclined longitudinally upwardly to drive the elevator conveyers.

2. A grain binder having a main frame, a platform carried thereby including a conveyer, a sickle carried by the platform, an elevator carried at one end of the platform including conveyers receiving cut grain from the platform conveyer, a main power shaft carried on the frame, a gear box carried on the frame enclosing gearing driven from said power shaft, a first shaft journaled in said box and driven by said gearing, said first shaft extending in a grainward direction and being connected to drive the platform conveyer, a second shaft extending longitudinally in a horizontal direction and operatively associated with said box and connected to drive the sickle, and a third shaft operatively associated with said box and connected to drive the elevator conveyers, said last mentioned shaft extending over the second shaft and inclined at an angle with respect thereto.

3. A grain binder having a longitudinal substantially rectangular horizontally disposed main frame, a transverse platform carried thereby at one end including a conveyer, a sickle carried by the forward edge of the platform, an elevator carried at the other end of the platform including conveyers receiving cut grain from the platform conveyer, a main transverse power shaft carried on the rear end of the main frame, a gear box carried on the frame at its rear end and enclosing gearing driven from said power shaft, and separate shafts each having an end journaled in said box and driven by said gearing, said separate shafts being respectively connected to drive the platform conveyer, sickle, and elevator conveyers, and the shaft which drives the platform conveyer extending grainwardly and being extensible.

4. A grain binder having a longitudinal main frame, a transverse platform carried thereby including a conveyer, a sickle carried by the forward edge of the platform, an elevator carried at one end of the platform including conveyers receiving cut grain from the platform conveyer, a main transverse power shaft carried on the rear end of the main frame, a gear box carried on the frame at its rear end and enclosing gearing driven from said power shaft, a first shaft journaled in said box and driven by said gearing, said first shaft being laterally and diagonally disposed and of the extensible type connected to drive the platform conveyer, a second shaft operatively associated with said gear box and extending longitudinally forwardly and connected to drive the sickle, and a third shaft operatively associated with said gear box and extending longitudinally and upwardly and connected to drive the elevator conveyers.

5. A grain binder having a main frame, a platform carried thereby including a conveyer, a sickle carried by the platform, a reel carried for rotation above the platform, an elevator carried at one end of the platform including conveyers receiving cut grain from the platform conveyer, a main power shaft carried on the frame, a gear box carried on the frame enclosing gearing driven from said power shaft, separate shafts journaled in said box and driven by said gearing, said separate shafts being respectively connected to drive the platform conveyer, sickle, and elevator conveyers, and means for taking power from the elevator conveyer drive to drive the reel.

6. A grain binder having a main frame, a platform carried thereby including a conveyer, a sickle carried by the platform, a reel carried for rotation above the platform, an elevator carried at one end of the platform including conveyers receiving cut grain from the platform conveyer, a main power shaft carried on the frame, a gear box carried on the frame enclosing gearing driven from said power shaft, a pair of shafts journaled in said box and driven by said gearing, said shafts being respectively connected to drive the platform conveyer and sickle, a third shaft operatively associated with the gear box, a housing on the elevator frame enclosing drive means driven from the third shaft for driving the elevator conveyers, means for taking power from said housing drive means to drive the reel, said last mentioned means embodying an extensible shaft including a universal joint.

7. A grain binder having a main frame, a platform carried thereby including a conveyer, a sickle carried by the platform, a reel carried for rotation above the platform, an elevator frame carried at one end of the platform including conveyers receiving cut grain from the platform conveyer, a main power shaft carried on the main frame, a gear box carried on the main frame enclosing gearing driven from said power shaft, a pair of shafts journaled in said box and driven by said gearing, said shafts being respectively connected to drive the platform conveyer and sickle, said elevator conveyers including drive rollers journaled in a housing carried on the elevator frame, chain gearing enclosed in the housing to drive said rollers, a third shaft operatively associated with the gear box and connected to drive said chain gearing, worm wheel gearing enclosed and carried in said housing and driven by the chain gearing, and an extensible shaft including a universal joint driven from the worm wheel gearing and connected to drive the reel.

8. A grain binder having a main frame, a platform carried thereby including a conveyer, a sickle carried by the platform, an elevator frame carried at one end of the platform including conveyers receiving cut grain from the platform conveyer, a binder deck carried on the frame to receive the grain from the elevator, an endless butter mounted on the binder deck, a main power shaft carried on the main frame, a gear box carried on the main frame enclosing gearing driven from said power shaft, a pair of shafts journaled in said box and driven by said gearing, said shafts being respectively connected to drive the platform conveyer and sickle, a housing carried on the elevator frame enclosing gearing for driving the elevator conveyers, and means for taking power from said housing gearing to drive the butter.

9. A grain binder having a main frame carrying crop gathering means, an elevator mounted on the frame including upper and lower conveyers to receive and elevate the crop, an elevated binder deck carried on the frame to receive the crop from said conveyers, a housing mounted on the elevator, sprocket wheels journaled in the housing, a chain for driving the wheels, means to drive the chain, one of the sprocket wheels serving to drive the upper elevator conveyer and another sprocket wheel serving to drive the lower elevator conveyer, a butt adjuster carried over the binder deck, and means for driving the butt adjuster from said chain.

10. A grain binder having a main frame carrying crop gathering means, an elevator mounted on the frame including upper and lower conveyers to receive and elevate the crop, a housing mounted on the elevator, sprocket wheels journaled in the housing, a chain inside the housing for driving the wheels, and means to drive the chain, one of the sprocket wheels serving to drive the upper elevator conveyer and another sprocket wheel serving to drive the lower elevator conveyer.

11. A grain binder having a main frame carrying crop gathering means, an elevator mounted on the frame including upper and lower conveyers to receive and elevate the crop, an elevated binder deck carried on the frame to receive the crop from said conveyers, a housing mounted on the elevator, gearing journaled in the housing, means to drive the gearing, said gearing serving to drive the said conveyers, an endless butt adjuster carried over the binder deck, and means for driving the butt adjuster from said housed gearing.

12. A grain binder having a main frame carrying crop gathering means including a rotatable reel, an elevator mounted on the frame to one side of the reel and including upper and lower conveyers to receive and elevate the crop, a housing mounted on the elevator, sprocket wheels journaled in the housing, a chain within the housing for driving the wheels, means to drive the chain, one of the sprocket wheels serving to drive the upper elevator conveyer and another sprocket wheel serving to drive the lower conveyer, worm gearing enclosed in said housing and driven by said chain, and an extensible shaft including a universal joint driven from the worm gearing and connected to drive said reel.

13. A grain binder having a main frame carrying crop gathering means including a rotatable reel, an elevator mounted on the frame to one side of the reel and including upper and lower conveyers to receive and elevate the crop, an enclosed housing mounted on the elevator, sprocket wheels journaled in the housing, a chain within the housing for driving the wheels, means to drive the chain, one of the sprocket wheels serving to drive the upper elevator conveyer and another sprocket wheel serving to drive the lower elevator conveyer, reduction gearing enclosed in said housing and driven by said chain, a shaft extending transversely from the housing and driven from the reduction gearing, said shaft including at least one universal joint and being connected to drive the reel.

14. A grain binder having a main frame carrying crop gathering means including a rotatable reel, an elevator mounted on the frame including upper and lower conveyers to receive and elevate the crop, an elevated binder deck carried on the frame to receive the crop from said conveyers, an enclosed housing mounted on the elevator, chain gearing journaled in the housing, means to drive the chain gearing, said chain gearing serving to drive the elevator conveyers, a movable butt adjuster carried over the binder deck, means for driving the butt adjuster from said chain gearing, reduction gears in the housing driven by the chain gearing, and a shaft including a universal joint driven by the reduction gearing and connected to drive the reel.

15. A grain binder having a main frame including a platform, an upright on the frame, a transverse shaft mounted on the upright, a reel bracket pivotally mounted on the shaft, a second bracket including an upwardly and outwardly curved arm including a horizontal portion extending laterally therefrom, said second bracket being pivotally carried on the reel bracket, upwardly extending spaced bearing brackets carried on the horizontal portion of the arm, a reel shaft journaled in said bearing brackets above the arm, and a reel mounted on the shaft in operative position over the platform.

16. A grain binder having a main frame including a platform, an upright on the frame, a transverse shaft mounted on the upright, a reel bracket pivotally mounted on the shaft, a web bracket pivotally carried on the reel bracket, an upwardly and outwardly curved gooseneck arm welded to the web bracket and having a horizontally extending lateral portion, bearing brackets carried on the lateral portion, a reel shaft journaled in said bearing brackets, and a reel mounted on the shaft in operative position over the platform.

17. A grain binder having a main frame and a platform, an elevator on the frame at one end of the platform, a binder deck adjacent the elevator including a binding attachment having an operating shaft, a main power shaft journaled on the main frame, an enclosed gear housing mounted on the main frame, a shaft journaled in said housing and connected by gears located in said housing to the power shaft, and means in said housing for driving the said operating shaft from the shaft in said housing.

18. A grain binder having a main frame and a platform, an elevator on the frame at one end of the platform, a binder deck adjacent the elevator including a binding attachment having an operating shaft, a main transverse power shaft journaled on the main frame at a level lower than the level of the operating shaft, an upright enclosed gear housing mounted on the main frame, an upright shaft journaled in said housing and connected by gears located in said housing at its lower end to the power shaft, and gears in said housing at its upper end for driving the said operating shaft from the upright shaft in said housing.

19. A grain binder having a main frame and a platform, a main wheel supporting the main frame, an elevator frame on the main frame at one end of the platform, a binder deck adjacent the elevator including a binding attachment having an operating shaft journaled on the elevator frame, a main power shaft journaled on the main frame, means for driving the power shaft from the main wheel, an enclosed gear housing mounted on the main frame, a shaft journaled in said housing and connected by gears located in said housing to the power shaft, and means in said housing for driving the said operating shaft from the shaft in said housing.

20. A grain binder having a main frame and a platform, an elevator frame on the main frame at one end of the platform, a binder deck adjacent the elevator including a binding attachment having a horizontal operating shaft journaled on the elevator frame, a main horizontal power shaft journaled on the main frame, means for driving the power shaft, an enclosed gear housing mounted on the main frame, a vertical shaft journaled in said housing and connected by gears located in said housing to the power shaft, and means in said housing for driving the said operating shaft from the shaft in said housing.

21. A grain binder having a main frame, a platform carried thereby, a reel including a reel shaft rotatably carried over the platform, an elevator frame located at one end of the platform including an upper and lower conveyer, an enclosed housing mounted on the elevator frame, chain gearing within the housing to drive said conveyers, one of said conveyers including a shaft journaled in the housing, reduction gearing driven from said shaft and enclosed in the housing, and another shaft driven by said last mentioned gearing including a universal joint for connecting the same to the reel shaft to drive the reel.

22. A grain binder having a main frame, a platform carried thereby, a reel including a reel shaft rotatably carried over the platform, an elevator frame located at one end of the platform including an upper and lower conveyer, an enclosed housing mounted on the elevator frame, gearing within the housing to drive said conveyers, one of said conveyers including a shaft journaled in the housings, worm gearing in the housing driven from said shaft, and an extensible shaft driven by said last mentioned gearing and including universal joints for connecting the same to the reel shaft to drive the reel.

23. A grain binder having a main frame, a platform carried thereby, a reel including a reel shaft rotatably carried over the platform, an elevator frame located at one end of the platform including an upper and lower conveyer, an enclosed housing mounted on the elevator frame, chain gearing within the housing to drive said conveyers, the upper conveyer including a shaft journaled in the housing, reduction gearing in the housing driven from said shaft, and another shaft driven by said reduction gearing including a universal joint for connecting the same to the reel shaft to drive the reel.

24. A grain binder having a main frame, a platform carried thereby, a reel including a reel shaft rotatably carried over the platform, an elevator frame located at one end of the platform including an upper and lower conveyer, an enclosed housing mounted on the elevator frame, chain gearing within the housing to drive said conveyers, the upper conveyer including a shaft journaled in the housing, worm gearing in the housing driven from said shaft, means for driving the chain gearing, and another shaft driven by said worm gearing including universal joints to drive the reel.

25. A grain binder having a main frame carrying an enclosed gear box, a main wheel carrying the frame, a transverse power shaft journaled on the frame and having one end entering said box, means to drive said shaft from the wheel, a platform carried by the frame including a sickle and a platform conveyer, a reel mounted above the platform, an elevator on the frame including upped and lower conveyers, a second gear box on the elevator including gearing to drive the elevator conveyers, means driven from said gearing to drive the reel, a binder deck including a butter adjacent the elevator, means driven from said gearing to drive the butter, a binding attachment including a binder shaft mounted adjacent the binder deck, means to drive said binder shaft from the power shaft, gearing in the first gear box for driving a shaft to operate the sickle, said gearing operating a second shaft to drive the gearing in the second box on the elevator, and another shaft driven from the gearing in the first box to drive the platform conveyer.

26. A grain binder having a main frame carrying an enclosed gear box, a power shaft journaled on the frame and having one end entering said box, means to drive said shaft, a platform carried by the frame including a sickle and a platform conveyer, a reel mounted above the platform, an elevator on the frame including upper and lower conveyers, a second gear box on the elevator including gearing to drive the elevator conveyers, means driven from said gearing to drive the reel, a binder deck including a butter adjacent the elevator, means driven from said gearing to drive the butter, a binding attachment including a binder shaft mounted adjacent the binder deck, means to drive said binder shaft from the power shaft, gearing in the first gear box for driving a shaft to operate the sickle, said gearing operating a second shaft to drive the gearing in the second box on the elevator, and another shaft driven from the gearing in the first box to drive the platform conveyer.

27. A grain binder having a main frame carrying an enclosed gear box, a main wheel carrying the frame, a transverse power shaft journaled on the frame and having one end entering said box, means to drive said shaft from the wheel, a platform carried by the frame including a sickle and a platform conveyer, a reel mounted above the platform, an elevator on the frame including upper and lower conveyers, a second enclosed gear box on the elevator including gearing to drive the elevator conveyers, means driven from said gearing to drive the reel, a binder deck including a butter adjacent the elevator, means driven from said gearing to drive the butter, a binding attachment including a binder shaft mounted adjacent the binder deck, a third enclosed box on the main frame including means to drive said binder shaft from the power shaft, gearing in the first gear box for driving a shaft to operate the sickle, said gearing operating a second shaft to drive the gearing in the second box on the elevator, and another shaft driven from the gearing in the first box to drive the platform conveyer.

28. A grain binder having a main frame carrying an enclosed gear box, a power shaft journaled on the frame and having one end entering said box, means to drive said shaft, a platform carried by the frame including a sickle and a platform conveyer, a reel mounted above the platform, an elevator on the frame including upper and lower conveyers, a second gear box on the elevator including gearing to drive the elevator conveyers, means driven from said gearing to drive the reel, a binder deck including a butter adjacent the elevator, means driven from said gearing to drive the butter, gearing in the first gear box for driving a shaft to operate the sickle, said gearing operating a second shaft to drive the gearing in the second box on the elevator, and another shaft driven from the gearing in the first box to drive the platform conveyer.

29. A grain binder having a main frame carrying an enclosed gear box, a main wheel carrying the frame, a transverse power shaft journaled on the frame and having one end entering said box, means to drive said shaft from the wheel, a platform carried by the frame including a sickle and a platform conveyer, a reel mounted above the platform, an elevator on the frame including upper and lower conveyers, a second gear box on the elevator including gearing to drive the elevator conveyers, means driven from said gearing to drive the reel, a binder deck including a butter adjacent the elevator, means driven from said gearing to drive the butter, gearing in the first gear box, and shafts journaled in the first gear box and driven from the gears therein to operate the sickle, the elevator, and the gearing in the second box to drive the platform conveyer.

30. In a grain binder, a horizontal substantially rectangular frame disposed transversely of the line of draft, an elevator frame at the stubbleward end of the frame including an elevator roller disposed longitudinally above the main frame, a longitudinal platform roller disposed on the main frame, a reciprocatory sickle at the front edge of the main frame, a gear-box carried on the main frame adjacent its rear edge and enclosing gearing, a drive-shaft journaled on the frame and in the gear-box and connected to drive the gearing therein, a pair of angularly diverging shafts extending longitudinally from and driven by the gearing in the gear-box and respectively connected to drive the sickle and elevator roller, and another shaft of the extensible type journaled in the box and extending grainwardly therefrom and geared to the platform roller to drive the latter.

31. In a grain binder, a horizontal substantially rectangular frame disposed transversely of the line of draft, an elevator frame at the stubbleward end of the frame including an elevator roller disposed longitudinally above the main frame, a longitudinal platform roller disposed on the main frame, a bevel-gear set mounted on the rear edge of the main frame and operatively associated with the platform roller to drive same, a reciprocatory sickle at the front edge of the main frame, a gear-box carried on the main frame adjacent its rear edge and enclosing gearing, a drive-shaft journaled on the frame and in the gear-box and connected to drive the gearing therein, a pair of angularly diverging shafts extending longitudinally from and driven by the gearing in the gear-box and respectively connected to drive the sickle and elevator roller, and another shaft journaled in the box and extending grainwardly and rearwardly therefrom and connected to the said bevel-gear set to drive same and the platform roller.

32. In a grain binder, a horizontal substantially rectangular frame disposed transversely of the line of draft, an elevated elevator frame at the stubbleward end of the frame including an elevator roller disposed longitudinally above the main frame, a longitudinal platform roller disposed on the main frame, a reciprocatory sickle at the front edge of the main frame, a gear-box carried on the main frame adjacent its rear edge and enclosing gearing, a substantially transverse drive-shaft journaled on the frame and in the gear-box and connected to drive the gearing therein, a manually controlled clutch disposed in said drive-shaft, a pair of angularly diverging shafts extending longitudinally from and driven by the gearing in the gear-box and respectively connected to drive the sickle and elevator roller, and another shaft journaled in the box and extending grainwardly therefrom and geared to the platform roller to drive the latter, the gearing in said gear-box being in constant driving relation at all times to all of said shafts.

33. In a grain binder, a horizontal rectangular frame disposed transversely of the line of draft, an elevator frame at the stubbleward end of the frame including an elevator roller disposed longitudinally above the main frame, a longitudinal platform roller disposed on the main frame, a reciprocatory sickle at the front edge of the main frame, a gear-box carried on the main frame adjacent its rear edge, said gear-box including four journal sleeve extensions angularly related to each other, a drive-shaft journaled on the frame and in one of said extensions, a pair of diverging shafts extending forwardly from and journaled respectively in two other of said extensions and respectively connected to drive the sickle and elevator roller, another shaft journaled in the remaining extension and extending grainwardly therefrom and connected to the platform roller to drive the latter, and constant mesh gears in said box and respectively carried on the several shafts whereby the drive-shaft serves to drive the remaining shafts.

ALEXUS C. LINDGREN.
CLEMMA R. RANEY